(12) United States Patent
Michaud

(10) Patent No.: US 12,209,158 B2
(45) Date of Patent: Jan. 28, 2025

(54) (METH)ACRYLIC COMPOSITION COMPRISING A MODIFIED POLYURETHANE

(71) Applicant: BOSTIK SA, Colombes (FR)

(72) Inventor: Guillaume Michaud, Venette (FR)

(73) Assignee: BOSTIK SA, Colombes (FR)

( * ) Notice: Subject to any disclaimer, the term of this patent is extended or adjusted under 35 U.S.C. 154(b) by 814 days.

(21) Appl. No.: 17/415,437

(22) PCT Filed: Dec. 18, 2019

(86) PCT No.: PCT/FR2019/053149
§ 371 (c)(1),
(2) Date: Jun. 17, 2021

(87) PCT Pub. No.: WO2020/128325
PCT Pub. Date: Jun. 25, 2020

(65) Prior Publication Data
US 2022/0056190 A1    Feb. 24, 2022

(30) Foreign Application Priority Data
Dec. 19, 2018   (FR) ...................................... 1873364

(51) Int. Cl.
| | |
|---|---|
| *C08G 18/12* | (2006.01) |
| *C08F 290/06* | (2006.01) |
| *C08F 290/14* | (2006.01) |
| *C08G 18/22* | (2006.01) |
| *C08G 18/66* | (2006.01) |
| *C08G 18/67* | (2006.01) |
| *C08G 18/76* | (2006.01) |
| *C08L 51/08* | (2006.01) |
| *C08L 75/14* | (2006.01) |
| *C08L 75/16* | (2006.01) |
| *C09D 175/14* | (2006.01) |
| *C09D 175/16* | (2006.01) |
| *C09J 175/14* | (2006.01) |
| *C09J 175/16* | (2006.01) |

(52) U.S. Cl.
CPC .......... *C08G 18/12* (2013.01); *C08F 290/067* (2013.01); *C08F 290/147* (2013.01); *C08G 18/227* (2013.01); *C08G 18/6688* (2013.01); *C08G 18/672* (2013.01); *C08G 18/7621* (2013.01); *C08G 18/7671* (2013.01); *C08L 51/08* (2013.01); *C08L 75/14* (2013.01); *C08L 75/16* (2013.01); *C09D 175/14* (2013.01); *C09D 175/16* (2013.01); *C09J 175/14* (2013.01); *C09J 175/16* (2013.01); *C08G 2170/00* (2013.01)

(58) Field of Classification Search
CPC .. C08G 18/12; C08G 18/672; C08G 2170/00; C08G 18/227; C08G 18/6688; C08G 18/7621; C08G 18/7671; C09J 175/16; C09J 174/14; C09J 175/14; C08F 290/067; C08F 290/147; C08L 51/08; C08L 75/14; C08L 75/16; C09D 175/14; C09D 175/16
See application file for complete search history.

(56) References Cited

U.S. PATENT DOCUMENTS

| | | | |
|---|---|---|---|
| 3,810,871 A | 5/1974 | Miron et al. | |
| 2015/0034243 A1* | 2/2015 | Haveman | C08G 18/329 525/450 |

FOREIGN PATENT DOCUMENTS

| | | | | |
|---|---|---|---|---|
| EP | 1070730 A2 * | 1/2001 | ............ | C08F 220/18 |
| WO | 2012164020 A1 | 12/2012 | | |
| WO | 2017151387 A1 | 9/2017 | | |

* cited by examiner

*Primary Examiner* — Rabon A Sergent
(74) *Attorney, Agent, or Firm* — NK Patent Law

(57) ABSTRACT

The present invention relates to a process for the preparation of a polyurethane comprising:

E1) a stage of preparation of a polyurethane having NCO endings comprising the polyaddition reaction between:
  i) at least one polyisocyanate;
  ii) at least one polyol; and
  iii) at least one amine having the following formula (I) or (II):

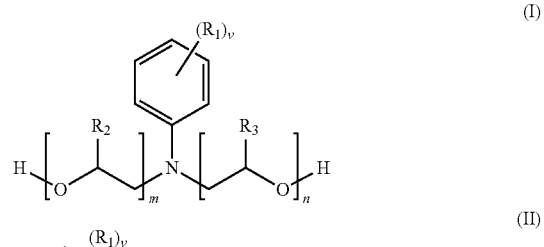

(I)

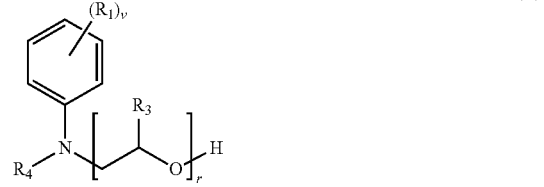

(II)

and

E2) the reaction of the product formed on conclusion of stage E1) with at least one (meth)acrylate or allyl monomer M comprising at least one hydroxyl functional group.

20 Claims, 1 Drawing Sheet

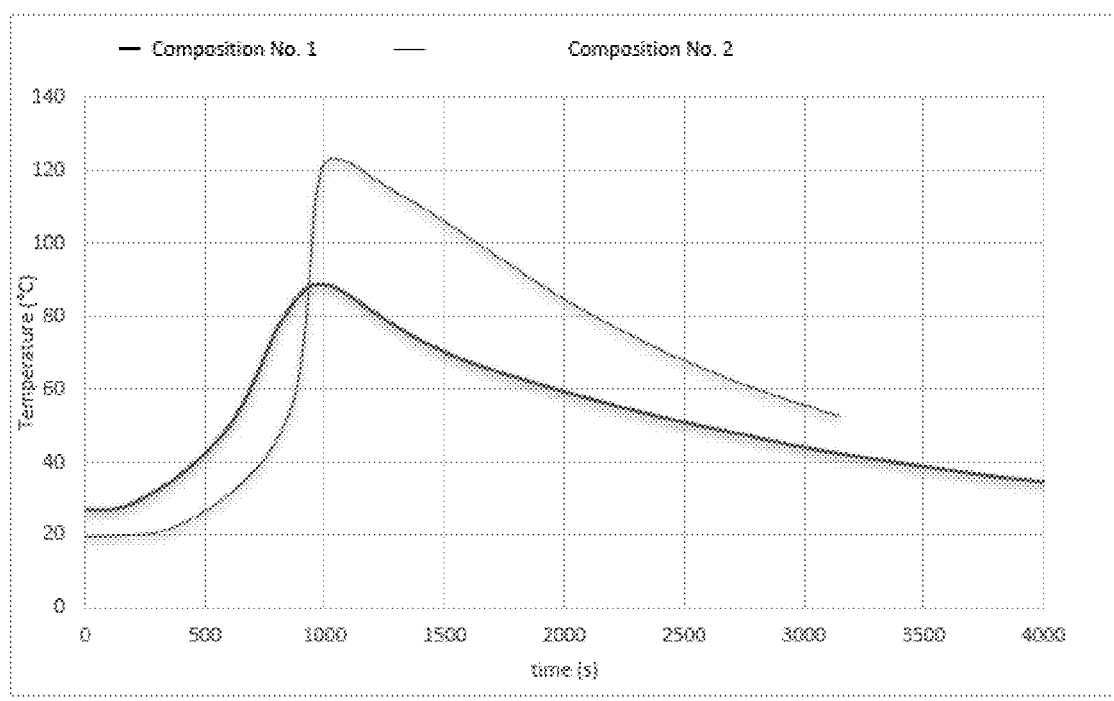

(METH)ACRYLIC COMPOSITION COMPRISING A MODIFIED POLYURETHANE

CROSS-REFERENCE TO RELATED APPLICATIONS

This application is a U.S. National Stage application of International Patent Application No. PCT/FR2019/053149, filed on Dec. 18, 2019, which claims the benefit of French Patent Application No. 1873364, filed on Dec. 19, 2018.

FIELD OF THE INVENTION

The present invention relates to a polyurethane modified by a tertiary amine substituted by an aromatic group.

The present invention also relates to its process of preparation, as well as to its use in compositions of (meth)acrylic type.

TECHNOLOGICAL BACKGROUND

Acrylic compositions are known reactive systems which crosslink by radical polymerization. They are used as adhesives, mastics and coatings. Radical polymerization is typically initiated by a redox system which, by means of an oxidation-reduction reaction, results in the production of radicals.

Most acrylic systems are two-component systems. The first component conventionally contains the reducing agent and the reactive monomers, and the second component contains the oxidizing agent. Once the two components have been mixed, the reducing agent induces cleavage of the O—O bond of the organic peroxide, and initiates polymerization.

Substituted anilines are mainly used as a reducing agent for the redox system. Mention may be made, for example, of N,N-dimethylaniline or also N,N-dimethyl-p-toluidine. However, these molecules exhibit several drawbacks: they are volatile, they are classified as CMR (carcinogenic-mutagenic-reprotoxic) and they can migrate over time after the polymerization, resulting in particular in a yellowing of the bonding or in a loss of adhesion.

There thus exists a need for new acrylic systems which do not exhibit at least one of the abovementioned disadvantages.

In particular, there exists a need for novel acrylic compositions which are less toxic to humans and the environment.

There also exists a need for novel acrylic compositions which are less toxic to humans and the environment, and which exhibit good adhesion properties.

DESCRIPTION OF THE INVENTION

In the present patent application, unless otherwise indicated:
- the amounts expressed in the percentage form correspond to weight/weight percentages;
- the hydroxyl number of an alcoholic compound represents the number of hydroxyl functional groups per gram of product, which is expressed in the form of the equivalent number of milligrams of potassium hydroxide (mg KOH/g) used in the quantitative determination of the hydroxyl functional groups, per gram of product;
- the viscosity measurement at 23° C. (or at 100° C. or at 70° C.) can be carried out using a Brookfield viscometer according to the standard ISO 2555. Typically, the measurement carried out at 23° C. (or at 100° C. or at 70° C.) can be performed using a Brookfield RVT viscometer with a spindle suited to the viscosity range and at a rotational speed of 20 revolutions per minute (rev/min);
- the number-average molecular weights (Mn) of the polyols, expressed in g/mol, are calculated from their hydroxyl numbers ($N_{CH}$) and from their functionalities.

Process

The present invention relates to a process for the preparation of a polyurethane comprising:

E1) a stage of preparation of a polyurethane having NCO endings comprising the polyaddition reaction between:
  i) at least one polyisocyanate;
  ii) at least one polyol; and
  iii) at least one amine having the following formula (I) or (II):

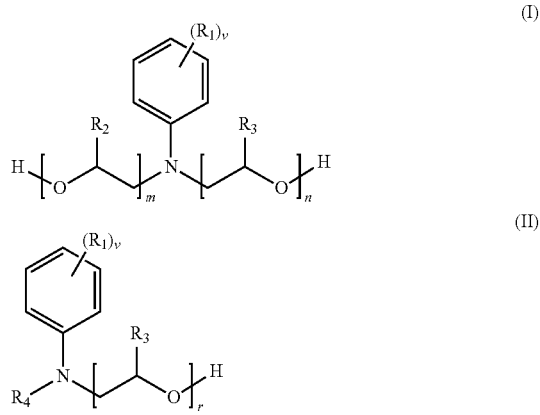

in which:
m and n are, independently of each other, an integer ranging from 1 to 150, preferably from 1 to 100, preferentially from 1 to 72, advantageously from 1 to 36, more advantageously still from 1 to 18;

r is an integer ranging from 1 to 200, preferably from 1 to 104, preferentially from 1 to 72, advantageously from 1 to 36;

$R^1$ represents a radical chosen from the group consisting of a saturated or unsaturated and linear or branched alkyl comprising from 1 to 20 carbon atoms, preferably from 1 to 10 carbon atoms; of a (hetero)aryl comprising from 6 to 12 carbon atoms; of a cycloalkyl comprising from 3 to 12 carbon atoms;

v represents an integer ranging from 0 to 5;

$R^2$ and $R^3$ represent, independently of each other, a halogen atom, a hydrogen atom or a linear or branched alkyl group comprising from 1 to 12 carbon atoms, said alkyl group being optionally interrupted by at least one oxygen atom;

$R^4$ represents a hydrogen atom, an arylalkyl group or a linear or branched alkyl group comprising from 1 to 20 carbon atoms, preferably an alkyl group comprising from 1 to 12 carbon atoms, advantageously from 1 to 6 carbon atoms;
provided that m+n>2, preferably n+m≥2.5;
and
E2) the reaction of the product formed on conclusion of stage E1) with at least one (meth)acrylate or allyl monomer M comprising at least one hydroxyl functional group.

Polyisocyanate(s)

The polyisocyanate(s) which can be used can be added sequentially or reacted in the form of a mixture.

The polyisocyanate(s) can be chosen from diisocyanates or triisocyanates.

According to one embodiment, the polyisocyanate(s) are diisocyanate(s), preferably chosen from the group consisting of isophorone diisocyanate (IPDI), hexamethylene diisocyanate (HDI), heptane diisocyanate, octane diisocyanate, nonane diisocyanate, decane diisocyanate, undecane diisocyanate, dodecane diisocyanate, 2,4'-methylenebis(cyclohexyl isocyanate) (2,4'-H6MDI), 4,4'-methylenebis(cyclohexyl isocyanate) (4,4'-H6MDI), norbornane diisocyanate, norbornene diisocyanate, 1,4-cyclohexane diisocyanate (CNDI), methylcyclohexane diisocyanate, ethylcyclohexane diisocyanate, propylcyclohexane diisocyanate, methyldiethylcyclohexane diisocyanate, cyclohexanedimethylene diisocyanate, 1,5-diisocyanato-2-methylpentane (MPDI), 1,6-diisocyanato-2,4,4-trimethylhexane, 1,6-diisocyanato-2,2,4-trimethylhexane (TMDI), 4-isocyanatomethyl-1,8-octane diisocyanate (TIN), 2,5-bis(isocyanatomethyl)bicyclo[2.2.1]heptane (2,5-NBDI), 2,6-bis(isocyanatomethyl)bicyclo[2.2.1]heptane (2,6-NBDI), bis(isocyanatomethyl)cyclohexane (H6-XDI) (in particular 1,3-bis(isocyanatomethyl)cyclohexane (1,3-H6-XDI)), xylylene diisocyanate (XDI) (in particular m-xylylene diisocyanate (m-XDI)), toluene diisocyanate (in particular toluene-2,4-diisocyanate (2,4-TDI) and/or toluene-2,6-diisocyanate (2,6-TDI)), diphenylmethane diisocyanate (in particular diphenylmethane-4,4'-diisocyanate (4,4'-MDI) and/or diphenylmethane-2,4'-diisocyanate (2,4'-MDI)), tetramethylxylylene diisocyanate (TMXDI) (in particular tetramethyl-m-xylylene diisocyanate), an HDI allophanate having, for example, the following formula (Y):

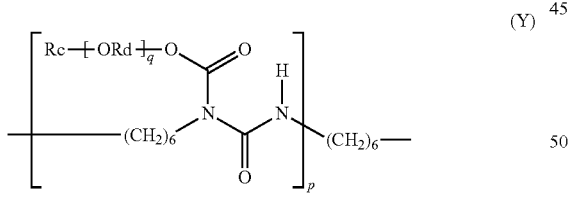

(Y)

in which p is an integer ranging from 1 to 2, q is an integer ranging from 0 to 9 and preferably from 2 to 5, Rc represents a saturated or unsaturated, cyclic or acyclic, linear or branched, hydrocarbon chain comprising from 1 to 20 carbon atoms, preferably from 6 to 14 carbon atoms, and Rd represents a linear or branched divalent alkylene group having from 2 to 4 carbon atoms, and preferably a divalent propylene group;
and their mixtures.

Preferably, the allophanate of abovementioned formula (Y) is such that p, q, Rc and Rd are chosen such that the above HDI allophanate derivative comprises a content of isocyanate NCO groups ranging from 12% to 14% by weight, with respect to the weight of said derivative.

According to one embodiment, the polyisocyanate(s) which can be used are triisocyanate(s), preferably chosen from isocyanurates, biurets, and adducts of diisocyanates and of triols.

In particular, the isocyanurate(s) can be used in the form of a technical mixture of (poly)isocyanurate(s) with a purity of greater than or equal to 70% by weight of isocyanurate(s).

The diisocyanate isocyanurate(s) which can be used according to the invention can correspond to the following general formula (W):

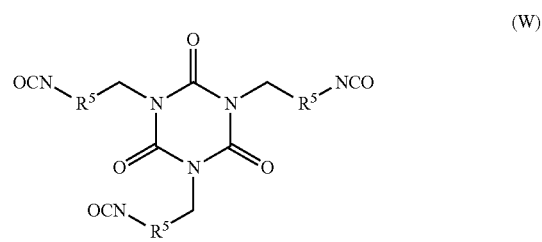

(W)

in which:

$R^5$ represents a linear or branched, cyclic, aliphatic, araliphatic or aromatic alkylene group comprising from 4 to 9 carbon atoms, with the proviso that the NCO groups are not connected by a covalent bond to a carbon atom forming part of an aromatic hydrocarbon ring, such as a phenyl group.

Mention may be made, as examples of diisocyanate trimers which can be used according to the invention, of:

the isocyanurate trimer of hexamethylene diisocyanate (HDI):

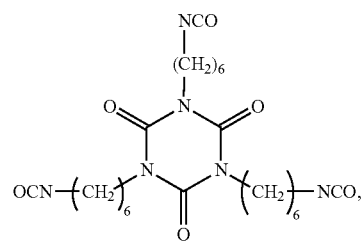

the isocyanurate trimer of isophorone diisocyanate (IPDI):

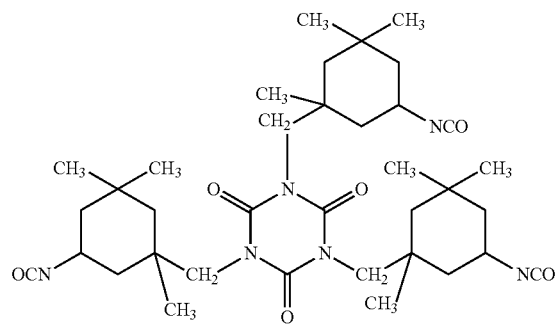

the isocyanurate trimer of pentamethylene diisocyanate (PDI):

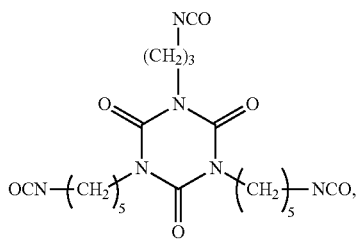

the isocyanurate trimer of meta-xylylene diisocyanate (m-XDI):

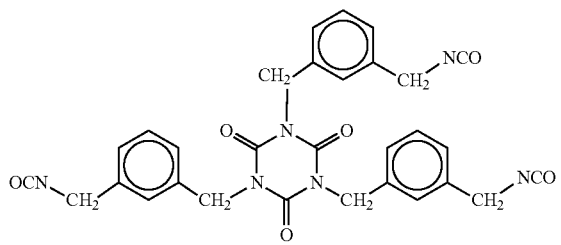

the isocyanurate trimer of m-XDI, in the hydrogenated form:

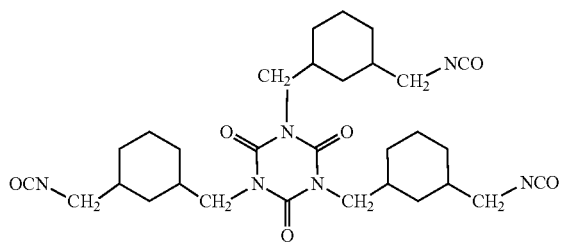

Mention may be made, as examples of adducts of diisocyanates and of triols which can be used according to the invention, of the adduct of meta-xylylene diisocyanate and of trimethylolpropane, as represented below. This adduct is sold, for example, by Mitsui Chemicals Inc under the name Takenate® D-110N.

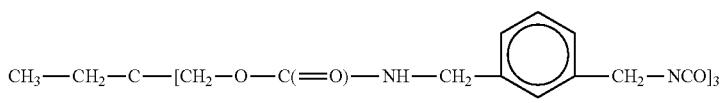

Preferably, the polyisocyanate(s) is (are) chosen from diisocyanates, preferentially from toluene diisocyanate (in particular the 2,4-TDI isomer, the 2,6-TDI isomer or their mixtures), diphenylmethane-4,4'-diisocyanate, diphenylmethane-2,4'-diisocyanate, meta-xylylene diisocyanate (m-XDI), isophorone diisocyanate (IPDI), and their mixtures.

More preferably still, the polyisocyanate is chosen from toluene diisocyanate (in particular the 2,4-TDI isomer, the 2,6-TDI isomer or their mixtures), and diphenylmethane diisocyanate (MDI).

The diphenylmethane diisocyanate can be provided in the form of a single isomer, for example chosen from 2,4'-MDI and 4,4'-MDI, or in the form of a mixture of isomers, for example 2,4'-MDI and 4,4'-MDI. Preferably, the diphenylmethane diisocyanate is provided in the form of a mixture of isomers comprising more than 50% by weight of the 4,4'-MDI isomer and less than 50% by weight of the 2,4'-MDI isomer, the percentages being with respect to the total weight of the diphenylmethane diisocyanate.

The polyisocyanate(s) which can be used are typically widely available commercially. Mention may be made, by way of example, of Scuranate® TX sold by Vencorex, corresponding to a 2,4-TDI with a purity of the order of 95%, Scuranate® T100 sold by Vencorex, corresponding to a 2,4-TDI with a purity of greater than 99% by weight, Desmodur® I sold by Covestro, corresponding to an IPDI, or also Desmodur® N3300 sold by Covestro, corresponding to an HDI isocyanurate, Takenate™ 500 sold by Mitsui Chemicals, corresponding to an m-XDI, Takenate™ 600 sold by Mitsui Chemicals, corresponding to an m-H6XDI, Vestanat® H12MDI sold by Evonik, corresponding to an H12MDI, or of Suprasec 2004 sold by Huntsman (mixture of approximately 70% by weight of 4,4'-MDI monomer and of 30% by weight of 2,4'-MDI monomer, having a percentage of NCO of 32.8%).

Polyol(s)

The polyol(s) can be chosen from polyester polyols, polyether polyols, polyene polyols, polycarbonate polyols, poly(ether-carbonate) polyols and their mixtures.

The polyol(s) which can be used can be chosen from aromatic polyols, aliphatic polyols, arylaliphatic polyols and the mixtures of these compounds.

The polyol(s) used according to the invention can be chosen from those having a number-average molecular weight (Mn) greater than or equal to 400 g/mol, preferably greater than or equal to 1000 g/mol, preferentially greater than or equal to 3000 g/mol and more preferentially still greater than or equal to 3500 g/mol.

Preferably, their hydroxyl functionality ranges from 2 to 6, preferentially from 2 to 3. The hydroxyl functionality is the mean number of hydroxyl functional groups per mole of polyol.

According to a specific embodiment, the hydroxyl number of polyol(s) exhibiting a hydroxyl functionality of 2 is less than or equal to 281 mg KOH/g, preferably less than or equal to 112 mg KOH/g, preferably less than or equal to 37 mg KOH/g, preferentially less than or equal to 32 mg KOH/g.

According to one embodiment, the hydroxyl number of polyol(s) exhibiting a hydroxyl functionality of 3 is less than or equal to 421 mg KOH/g, preferably less than or equal to 168 mg KOH/g, preferably less than or equal to 56 mg KOH/g, preferentially less than or equal to 48 mg KOH/g.

According to the invention, the polyester polyol(s) can have a number-average molecular weight ranging from 1000 g/mol to 10000 g/mol.

The polyester polyols can be chosen from polyester diols and polyester triols, and preferably from polyester diols.

Mention may be made, among the polyester polyols, for example, of:
polyester polyols of natural origin, such as castor oil;
polyester polyols resulting from the polycondensation:
of one or more aliphatic (linear, branched or cyclic) or aromatic polyols, such as, for example, monoethylene glycol, diethylene glycol, 1,2-propanediol, 1,3-propanediol, 1,4-butanediol, butenediol, 1,6-hexanediol, cyclohexanedimethanol, tricyclodecanedimethanol, neopentyl glycol, cyclohexanedimethanol, a polyether polyol, glycerol, trimethylolpropane, 1,2,6-hexanetriol, sucrose, glucose, sorbitol, pentaerythritol, mannitol, N-methyldiethanolamine, triethanolamine, a fatty alcohol dimer, a fatty alcohol trimer and their mixtures, with
one or more polycarboxylic acids or its ester or anhydride derivative, such as 1,6-hexanedioic acid (adipic acid), dodecanedioic acid, azelaic acid, sebacic acid, adipic acid, 1,18-octadecanedioic acid, phthalic acid, isophthalic acid, terephthalic acid, succinic acid, a fatty acid dimer, a fatty acid trimer and the mixtures of these acids, an unsaturated anhydride, such as, for example, maleic or phthalic anhydride, or a lactone, such as, for example, caprolactone;
estolide polyols resulting from the polycondensation of one or more hydroxy acids, such as ricinoleic acid, with a diol (mention may be made, for example, of Polycin® D-1000 and Polycin® D-2000 available from Vertellus).

The abovementioned polyester polyols can be prepared conventionally and are for the most part commercially available.

Mention may be made, among polyester polyols, for example, of the following products with a hydroxyl functionality equal to 2:
Tone® 0240 (sold by Union Carbide), which is a polycaprolactone with a number-average molecular weight of approximately 2000 g/mol and a melting point of approximately 50° C.,
Dynacoll® 7381 (sold by Evonik) with a number-average molecular weight of approximately 3500 g/mol and having a melting point of approximately 65° C.,
Dynacoll® 7360 (sold by Evonik), which results from the condensation of adipic acid with hexanediol and has a number-average molecular weight of approximately 3500 g/mol and a melting point of approximately 55° C.,
Dynacoll® 7330 (sold by Evonik) with a number-average molecular weight of approximately 3500 g/mol and having a melting point of approximately 85° C.,
Dynacoll® 7363 (sold by Evonik), which also results from the condensation of adipic acid with hexanediol and has a number-average molecular weight of approximately 5500 g/mol and a melting point of approximately 57° C.,
Dynacoll® 7250 (sold by Evonik): polyester polyol having a viscosity of 180 Pa·s at 23° C., a number-average molecular weight Mn equal to 5500 g/mol and a $T_g$ equal to −50° C.,
Kuraray® P-6010 (sold by Kuraray): polyester polyol having a viscosity of 68 Pa·s at 23° C., a number-average molecular weight Mn equal to 6000 g/mol and a $T_g$ equal to −64° C.,
Kuraray® P-10010 (sold by Kuraray): polyester polyol having a viscosity of 687 Pa·s at 23° C. and a number-average molecular weight Mn equal to 10000 g/mol,
Realkyd® XTR 10410 (sold by Cray Valley): polyester polyol having a number-average molecular weight Mn in the vicinity of 1000 g/mol and the hydroxyl number of which ranges from 108 to 116 mg KOH/g. It is a product resulting from the condensation of adipic acid, diethylene glycol and monoethylene glycol,
Dekatol® 3008 (sold by Bostik) with a number-average molar mass Mn in the vicinity of 1060 g/mol and the hydroxyl number of which ranges from 102 to 112 mg KOH/g. It is a product resulting from the condensation of adipic acid, diethylene glycol and monoethylene glycol.

Preferably, the polyester polyols are not polyesters derived from animal oils or vegetable oils.

Preferably, the polyester polyols are not triglyceride derivatives.

Preferably, the polyester polyols have a number-average molecular weight of greater than 2000 g/mol, preferentially of greater than or equal to 3000 g/mol, advantageously of greater than or equal to 3500 g/mol and in particular of greater than or equal to 4000 g/mol.

According to the invention, the polyether polyol(s) can have a number-average molecular weight ranging from 400 to 20000 g/mol, preferably from 1000 to 12000 g/mol and preferably from 1000 to 8000 g/mol.

The polyether polyol(s) which can be used according to the invention is (are) preferably chosen from polyoxyalkylene polyols, the linear or branched alkylene part of which comprises from 1 to 4 carbon atoms, more preferentially from 2 to 3 carbon atoms.

More preferentially, the polyether polyol(s) which can be used according to the invention is (are) preferably chosen from polyoxyalkylene diols or polyoxyalkylene triols, the linear or branched alkylene part of which comprises from 1 to 4 carbon atoms, more preferentially from 2 to 3 carbon atoms.

Mention may be made, as examples of polyoxyalkylene diols or triols which can be used according to the invention, of:
polyoxypropylene diols or triols (also denoted by polypropylene glycol (PPG) diols or triols) having a number-average molecular weight (Mn) ranging from 400 to 20000 g/mol;
polyoxyethylene diols or triols (also denoted by polyethylene glycol (PEG) diols or triols) having a number-average molecular weight (Mn) ranging from 400 to 20000 g/mol;
and their mixtures.

The abovementioned polyether polyols can be prepared conventionally and are widely available commercially. They can be obtained by polymerization of the corresponding alkylene oxide in the presence of a basic catalyst (for example potassium hydroxide) or of a catalyst based on a double metal/cyanide complex.

Mention may be made, as examples of polyether diol, of:
Voranol® P1010 sold by Dow with a number-average molecular weight (Mn) in the vicinity of 1020 g/mol and the hydroxyl number of which is approximately 110 mg KOH/g;
Voranol® EP 1900: sold by Dow, difunctional PPG with a number-average molecular weight of approximately 4008 g/mol and with a hydroxyl number $N_{OH}$ equal to 28 mg KOH/g;
Acclaim® 4200: difunctional PPG with a number-average molecular weight of approximately 4000 g/mol and with a hydroxyl number $N_{OH}$ equal to 28 mg KOH/g;

Acclaim® 8200: difunctional PPG with a number-average molecular weight of 8016 g/mol and with a hydroxyl number $N_{OH}$ equal to 14 mg KOH/g;

Acclaim® 12200: difunctional PPG with a number-average molecular weight of 11 222 g/mol and with a hydroxyl number $N_{OH}$ equal to 10 mg KOH/g;

Acclaim® 18200: difunctional PPG with a number-average molecular weight of 17 265 g/mol and with a hydroxyl number $N_{OH}$ equal to 6.5 mg KOH/g.

Mention may be made, as examples of polyether triol, of the polyoxypropylene triol sold under the name Voranol® CP 450 by Dow with a number-average molecular weight (Mn) in the vicinity of 450 g/mol and the hydroxyl number of which ranges from 370 to 396 mg KOH/g, or the polyoxypropylene triol sold under the name Voranol® CP3355 by Dow with a number-average molecular weight in the vicinity of 3554 g/mol, or Acclaim® 6300, which is a trifunctional PPG with a number-average molecular weight of approximately 5948 g/mol and with a hydroxyl number $N_{OH}$ equal to 28.3 mg KOH/g.

The polyene polyol(s) which can be used according to the invention can preferably be chosen from polyenes comprising hydroxyl end groups, and their corresponding hydrogenated or epoxidized derivatives.

Preferably, the polyene polyol(s) which can be used according to the invention is (are) chosen from polybutadienes including hydroxyl end groups, which are optionally hydrogenated or epoxidized. Preferentially, the polyene polyol(s) which can be used according to the invention is (are) chosen from butadiene homopolymers and copolymers comprising hydroxyl end groups, which are optionally hydrogenated or epoxidized.

In the context of the invention, and unless otherwise mentioned, the term "hydroxyl end groups" of a polyene polyol is understood to mean the hydroxyl groups located at the ends of the main chain of the polyene polyol.

The abovementioned hydrogenated derivatives can be obtained by complete or partial hydrogenation of the double bonds of a polydiene comprising hydroxyl end groups, and are thus saturated or unsaturated.

The abovementioned epoxidized derivatives can be obtained by chemoselective epoxidation of the double bonds of the main chain of a polyene comprising hydroxyl end groups, and thus comprise at least one epoxy group in their main chain.

Mention may be made, as examples of polyene polyols, of saturated or unsaturated butadiene homopolymers comprising hydroxyl end groups, which are optionally epoxidized, such as, for example, those sold under the name Poly BD® or Krasol® by Cray Valley.

The polycarbonate polyols can be chosen from polycarbonate diols or triols, having in particular a number-average molecular weight (Mn) ranging from 400 to 20000 g/mol.

Mention may be made, as examples of polycarbonate diol, of:

Converge® Polyol 212-10 and Converge® Polyol 212-20 sold by Novomer respectively with number-average molecular weights (Mn) equal to 1000 and 2000 g/mol, the hydroxyl numbers of which are respectively 112 and 56 mg KOH/g, Polyol C-590, C1090, C-2090 and C-3090 sold by Kuraray, having a number-average molecular weight (Mn) ranging from 500 to 3000 g/mol and a hydroxyl number ranging from 224 to 37 mg KOH/g.

According to a preferred embodiment, the polyols are not polyesters. This embodiment advantageously makes it possible to result in adhesive bondings (after crosslinking of the composition) having better properties of resistance to hydrolysis in comparison with compositions resulting from polyesters.

Preferably, the polyols comprise at least one polyether polyol; preferentially, the polyols are only chosen from polyether polyols.

Amine of Formula (I) or Formula (II)

In the abovementioned formula (I), v has a value preferably of 1 and $R^1$ is preferably in the para position.

The amines of formula (I) are preferably chosen from those in which:
$R^1$ represents a saturated or unsaturated and linear or branched alkyl comprising from 1 to 20 carbon atoms, preferably from 1 to 10 carbon atoms; preferentially, $R^1$ represents methyl;

m and n represent, independently of each other, an integer ranging from 1 to 18, preferably from 1 to 9, advantageously from 1 to 5;

$R^2$ and $R^3$ represent, independently of each other, a hydrogen atom or a linear or branched alkyl group comprising from 1 to 12 carbon atoms, said alkyl group being optionally interrupted by at least one oxygen atom; preferably, $R^2$ and $R^3$ each represent a hydrogen atom;

with m+n>2, preferably n+m≥2.5.

Preferably, the amines of formula (I) are those in which:
$R^1$ represents a linear or branched alkyl comprising from 1 to 5 carbon atoms; preferentially, $R^1$ represents methyl;

m and n represent, independently of each other, an integer ranging from 1 to 18, preferably from 1 to 9, advantageously from 1 to 5;

$R^2$ and $R^3$ represent a hydrogen atom;
with that m+n>2, preferably n+m≥2.5.

According to one embodiment, stage E1) is carried out in the presence of a mixture of different amines of formula (I).

Mention may be made, among the amines of formula (I), for example, of Bisomer® PTE (CAS number: 878391-30-1) sold by Geo Speciality Chemicals, Accelerator PT25E (CAS number: 878391-30-1) sold by Lanxess, N,N-bis(2-hydroxypropyl)-p-aniline (CAS number: 3077-13-2) available from Biosynth, N,N-bis(2-hydroxypropyl)-p-toluidine (CAS number: 38668-48-3) sold by BASF, Ethox ANA-10 (CAS number: 36356-83-9) available from Ethox Chemical.

In the abovementioned formula (II), v has a value preferably of 1 and $R^1$ is preferably in the para position.

The amines of formula (II) are preferably chosen from those in which:
$R^1$ represents a saturated or unsaturated and linear or branched alkyl comprising from 1 to 20 carbon atoms, preferably from 1 to 10 carbon atoms; preferentially, $R^1$ represents methyl;

r represents an integer ranging from 1 to 36, preferably from 1 to 18, advantageously from 1 to 10;

$R^3$ represents a halogen atom, a hydrogen atom or a linear or branched alkyl group comprising from 1 to 12 carbon atoms, said alkyl group being optionally interrupted by at least one oxygen atom;

$R^4$ represents a hydrogen atom, an arylalkyl group, or a linear or branched alkyl group comprising from 1 to 20 carbon atoms, preferably from 1 to 6 carbon atoms.

Mention may be made, among the amines of formula (II), for example, of N-(2-hydroxyethyl)-N-methylaniline (CAS number: 93-90-3) available from Sigma-Aldrich and N-(2-hydroxyethyl)-N-methyl-p-toluidine (MHPT, CAS number: 2842-44-6) available from Parchem.

Preferably, the abovementioned stage E1) is carried out in the presence of amine(s) of formula (I).

Monomer(s) M

The monomer M can be chosen from:

M1 monomers having the following formula (III):

$$CH_2=CH-R^t-OH \quad (III)$$

in which $R^t$ represents a linear or branched alkylene radical comprising from 1 to 9 carbon atoms, preferably from 1 to 4 carbon atoms;

or

M2 monomers having the following formula (IV):

$$CH_2=C(R^6)-C(=O)-O-R^7-OH \quad (IV)$$

in which:

$R^6$ represents a hydrogen or a methyl;

$R^7$ represents a saturated or unsaturated, aliphatic or cyclic, linear or branched, divalent hydrocarbon radical preferably comprising from 2 to 240 carbon atoms, and being optionally interrupted by one or more heteroatoms (such as, for example, N, O or S, and in particular O), and/or optionally interrupted by one or more aromatic groups, and/or optionally interrupted by one or more divalent —N($R_a$)— groups with $R_a$ representing a linear or branched alkyl radical comprising from 1 to 22 carbon atoms (tertiary amine), —C(=O)O— (ester), —C(=O)NH— (amide), —NHC(=O)O— (carbamate), —NHC(=O)—NH— (urea) or —C(=O)— (carbonyl) groups, and/or being optionally substituted.

Mention may be made, among the M1 monomers, for example, of those of abovementioned formula (III) in which $R^t$ represents a methylene, an ethylene or a propylene.

Preferably, the M2 monomer has one of the following formulae:

Formula (IV-1):

$$CH_2=C(-C(=O)-O-R^7-OH \quad (IV-1)$$

in which:

$R^6$ is as defined above;

$R^7$ represents a saturated or unsaturated, linear or branched, aliphatic or cyclic, divalent alkylene radical comprising from 2 to 22 carbon atoms, preferably from 2 to 18, preferentially from 2 to 14, more preferentially still from 2 to 10 and advantageously from 2 to 6 carbon atoms;

Formula (IV-2):

$$CH_2=C(R^6)-C(=O)-O-R^8-O-[C(=O)-(CH_2)_w-O]_s-H \quad (IV-2)$$

in which:

$R^6$ is as defined above;

w is an integer ranging from 1 to 10, preferably from 1 to 5, and preferentially w is equal to 5;

s is an integer ranging from 1 to 10, s preferably being equal to 2;

$R^8$ represents a saturated or unsaturated, linear or branched, aliphatic or cyclic, divalent alkylene radical comprising from 2 to 22 carbon atoms, preferably from 2 to 18, preferentially from 2 to 14, more preferentially still from 2 to 10 and advantageously from 2 to 6 carbon atoms;

Formula (IV-3):

$$CH_2=C(R^6)-C(=O)-O-[R^9-O]_t-H \quad (IV-3)$$

in which:

$R^6$ is as defined above;

$R^9$ represents a saturated or unsaturated, linear or branched, aliphatic or cyclic, divalent alkylene radical comprising from 2 to 4 carbon atoms and t is an integer ranging from 2 to 120, preferably from 1 to 10, t preferably being equal to 2 or 3.

Mention may be made, among the monomers of formula (IV-1), for example, of 2-hydroxyethyl acrylate (HEA), 2-hydroxyethyl methacrylate (HEMA), 2-hydroxypropyl acrylate (HPA), 2-hydroxypropyl methacrylate, 4-hydroxybutyl acrylate (4-HBA), 4-hydroxybutyl methacrylate, 2-hydroxybutyl acrylate (HBA) or 2-hydroxybutyl methacrylate (for example which are available from Sartomer, Cognis or BASF).

Mention may be made, among the monomers of formula (IV-2) above, for example, of polycaprolactone acrylate SR 495B (CAPA) available from Sartomer or hydroxyethylcaprolactone acrylate (HECLA) available from BASF.

Mention may be made, among the ethoxylated and/or propoxylated derivatives of acrylic acid of abovementioned formula (I-3), for example, of Blemmer® AP-150, Blemmer® AP-200, Blemmer® AP-400, Blemmer® AP-550, Blemmer® AP-800, Blemmer® AP-1000, Blemmer® AE-90, Blemmer® AE-150, Blemmer® AE-200, Blemmer® AE-350 or Blemmer® AE-400, sold by Nippon Oil & Fats Corporation, or also SR 604 from Sartomer.

Preferably, the monomer M is an M2 monomer.

More preferably still, the monomer M has the abovementioned formula (IV-1) and in particular one of the following formulae (IV-1-1), (IV-1-2) or (IV-1-3):

(IV-1-1): 2-hydroxyethyl acrylate (HEA):

$$CH_2=CH-C(=O)-O-CH_2-CH_2-OH$$

(IV-1-2): 2-hydroxypropyl acrylate (HPA):

$$CH_2=CH-C(=O)-O-CH_2-CH(Me)-OH$$

(IV-1-3): 2-hydroxyethyl methacrylate (HEMA).

$$CH_2=CH(Me)-C(=O)-O-CH_2-CH_2-OH$$

Stage E1)

The polyaddition reaction E1) can be carried out at a temperature preferably of less than 95° C. and/or under preferably anhydrous conditions.

The polyaddition reaction can be carried out in the presence or absence of at least one catalyst.

The reaction catalyst(s) which can be used during the polyaddition reaction can be any catalyst known to a person skilled in the art for catalysing the formation of polyurethane by reaction of at least one polyisocyanate with at least one polyol.

An amount ranging up to 0.3% by weight of catalyst(s), with respect to the weight of the reaction medium of the polyaddition stage, can be used.

The polyaddition reaction E1) can be carried out in the presence or absence of at least one solvent. The solvent can be chosen from solvents which do not react with the reactive functional groups of the ingredients used in stage E1). It can, for example, be methyl methacrylate, toluene, ethyl acetate, xylene and their mixtures.

Stage E1) is preferably carried out in amounts of reactants such that the NCO/OH molar ratio (r1) ranges from 1.5 to 5, preferably from 1.5 to 2.5.

In the context of the invention, and unless otherwise mentioned, (r1) is the NCO/OH molar ratio corresponding to the molar ratio of the number of isocyanate (NCO) groups to the number of hydroxyl (OH) groups carried by respectively all of the polyisocyanate(s) and all of the alcohol(s)

present in the reaction medium of stage E1) (polyol(s), amine(s) of formula (I) or (II)).

Stage E2)

Stage E2) can be carried out at a temperature preferably of less than 95° C. and/or under preferably anhydrous conditions.

Stage E2) can be carried out in the presence or absence of at least one catalyst. It can be the same catalyst as that used in stage E1).

Stage E2) can be carried out in the presence or absence of at least one solvent. The solvent can be chosen from solvents which do not react with the reactive functional groups of the ingredients used in stage E2). It can, for example, be methyl methacrylate, toluene, ethyl acetate, xylene and their mixtures.

Preferably, stage E2) is carried out by addition of the monomer(s) M to the reaction medium of stage E1), without isolation of the product formed in stage E1).

Stage E2) is preferably carried out in amounts of reactants such that the OH/NCO molar ratio (r2) is less than or equal to 1, preferentially ranges from 0.90 to 1.00 and more preferentially still ranges from 0.95 to 1.00.

In the context of the invention, and unless otherwise mentioned, (r2) is the OH/NCO molar ratio corresponding to the molar ratio of the number of hydroxyl (OH) groups to the number of isocyanate (NCO) groups carried respectively by all of the alcohol(s) and of the isocyanate(s) (as regards in particular the polyurethane having NCO endings and optionally the polyisocyanate(s) which have not reacted on conclusion of stage E1)) present in the reaction medium of stage E2).

Polymer P

The present invention also relates to a polyurethane P obtained according to the abovementioned process.

The polyurethane preferably comprises from 0.5% to 10%, preferentially from 1% to 5%, by weight of units derived from the amine of abovementioned formula (I) or abovementioned formula (II), preferably from the amine of formula (I).

The polyurethane can have a number-average molecular weight (Mn) ranging from 1000 to 30000 g/mol, preferably from 10000 to 20000 g/mol.

Preferably, the polyurethane P is a polyurethane having (meth)acrylate or allyl endings, preferentially having (meth) acrylate endings.

The polymer P can have a viscosity at 70° C. ranging from 5000 mPa·s to 50000 mPa·s, preferably ranging from 10000 mPa·s to 35000 mPa·s.

The use of such a polymer P according to the invention advantageously makes it possible to facilitate the composition formulation and to avoid additional solubilization stages by additional use of solvents, diluents, and the like.

The present invention also relates to the use of a polyurethane P as defined above as radical polymerization initiator, in particular in (meth)acrylic compositions.

Composition

The present invention also relates to a composition comprising:
 a composition A comprising:
  at least one polymer P as described above; and
  at least one vinyl monomer;
 a composition B comprising:
  at least one peroxide; and
  optionally at least one vinyl monomer.

Preferably, the composition B comprises at least one vinyl monomer.

The vinyl monomers in the composition A and in the composition B can be identical or different.

The term "vinyl monomer" is well known and is understood to mean a monomer having the following formula:

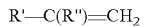

$R'—C(R'')=CH_2$

The vinyl monomers can be chosen from (meth)acrylate monomers (including in particular cyanoacrylates); N-vinyl-heterocyclic derivatives, such as N-vinylpyrrolidone, N-vinylcaprolactam or N-vinylimidazole; vinylaromatic derivatives, such as styrene, α-methylstyrene and vinyltoluene isomers; vinyl esters of aliphatic $C_1$ to $C_{20}$ carboxylic acids, for example vinyl acetate, vinyl propionate, vinyl butyrate, vinyl hexanoate, vinyl laurate, vinyl stearate and vinyl versatate; and their mixtures.

Preferably, the vinyl monomers are chosen from (meth) acrylate monomers.

The (meth)acrylate monomer(s) can be chosen from the group consisting of:
 compounds having the following formula (V):

$$CH_2=C(R^{10})—COOR^{11} \qquad (V)$$

in which:
 $R^{10}$ represents a hydrogen, a halogen, a CN group or an alkyl group comprising from 1 to 4 carbon atoms;
 $R^{11}$ is chosen from the group consisting of alkyls, cycloalkyls, alkenyls, cycloalkenyls, alkylaryls, arylalkyls and aryls, it being possible for said alkyls, cycloalkyls, alkenyls, cycloalkenyls, alkylaryls, arylalkyls or aryls to be optionally substituted and/or interrupted by at least one silane, one silicone, one oxygen, one halogen, one carbonyl, one hydroxyl, one ester, one urea, one urethane, one carbonate, one amine, one amide, one sulfur, one sulfonate or one sulfone;
 polyethylene glycol di(meth)acrylates;
 tetrahydrofuran (meth)acrylates;
 hydroxypropyl (meth)acrylate;
 hexanediol di(meth)acrylate;
 trimethylolpropane tri(meth)acrylate;
 diethylene glycol dimethacrylate;
 triethylene glycol dimethacrylate;
 tetraethylene glycol dimethacrylate;
 dipropylene glycol dimethacrylate;
 di(pentamethylene glycol) dimethacrylate;
 tetraethylene glycol diacrylate;
 diglycerol tetramethacrylate;
 tetramethylene dimethacrylate;
 ethylene dimethacrylate;
 neopentyl glycol diacrylate;
 trimethylolpropane triacrylate;
 bisphenol A mono- and di(meth)acrylates;
 bisphenol F mono- and di(meth)acrylates; and
 their mixtures.

According to one embodiment, the (meth)acrylate monomer is chosen from methyl 2-cyanoacrylate, ethyl 2-cyanoacrylate, butyl 2-cyanoacrylate, octyl 2-cyanoacrylate, 2-methoxyethyl 2-cyanoacrylate, 2-ethoxyethyl 2-cyanoacrylate, methyl (meth)acrylate, ethyl (meth)acrylate, 2-ethylhexyl (meth)acrylate, heptyl (meth)acrylate, 2-(tert-butyl) heptyl (meth)acrylate, octyl (meth)acrylate, 3-isopropylheptyl (meth)acrylate, nonyl (meth)acrylate, decyl (meth)acrylate, undecyl (meth)acrylate, 5-methylundecyl (meth)acrylate, dodecyl (meth)acrylate, 2-methyldodecyl (meth)acrylate, tridecyl (meth)acrylate, 5-methyltridecyl (meth)acrylate, tetradecyl (meth)acrylate, pentadecyl (meth)acrylate, hexadecyl (meth)acrylate, 2-methylhexadecyl (meth)acrylate, heptadecyl (meth)acrylate, 5-isopropylheptadecyl (meth)acrylate, 4-(tert-butyl)octadecyl (meth) acrylate, 5-ethyloctadecyl (meth)acrylate, 3-isopropyloctadecyl (meth)acrylate, octadecyl (meth)acrylate, nonadecyl (meth)acrylate, eicosyl (meth)acrylate, 3-vinylcyclohexyl (meth)acrylate, bornyl (meth)acrylate, 2,4,5-tri(t-butyl)-3-vinylcyclohexyl (meth)acrylate, 2,3,4,5-tetra(t-butyl)cyclohexyl (meth)acrylate, benzyl (meth)acrylate, phenyl (meth)acrylate, 2-(2-ethoxyethoxy)ethyl (meth)acrylate, 2-phenoxyethyl (meth)acrylate and their mixtures.

Preferably, the (meth)acrylate monomer is chosen from the compounds of abovementioned formula (V). Preferably, the compounds of formula (V) are those in which:
  $R^{10}$ represents a hydrogen or an alkyl group comprising from 1 to 4 carbon atoms;
  $R^{11}$ represents an alkyl group preferably comprising from 1 to 20 carbon atoms, preferably from 1 to 10 carbon atoms.

More preferentially still, the (meth)acrylate monomer is methyl methacrylate.

The peroxide is used in particular as radical polymerization initiator.

The peroxide can be chosen from organic peroxides, inorganic peroxides and their mixtures.

Mention may be made, among the inorganic peroxides, of peroxydisulfuric acid and its salts, such as ammonium peroxodisulfate, sodium peroxodisulfate and potassium peroxodisulfate.

Mention may be made, among the organic peroxides, of cumene hydroperoxide, para-menthane hydroperoxide, tert-butyl peroxyisobutyrate, tert-butyl peroxybenzoate, tert-butyl peroxyneodecanoate, tert-amyl peroxypivalate, acetyl peroxide, benzoyl peroxide, dibenzoyl peroxide, 1,3-bis(t-butylperoxyisopropyl)benzene, diacetyl peroxide, t-butyl-cumyl peroxide, tert-butyl peroxyacetate, cumyl peroxide 2,5-dimethyl-2,5-di(t-butylperoxy)hexane, 2,5-dimethyl-2,5-di(t-butylperoxy)hex-3-yne, 4-methyl-2,2-di(t-butylperoxy)pentane and their mixtures.

Preferably, the composition B comprises benzoyl peroxide.

The peroxide functional group/amine functional group of formula (I) contained in the polyurethane P molar ratio can range from 0.3 to 1.5.

The composition according to the invention can comprise at least one additive chosen from the group consisting of catalysts, fillers, antioxidants, light stabilizers/UV absorbers, metal deactivators, antistatics, antifog agents, foaming agents, biocides, plasticizers, lubricants, emulsifiers, dyes, pigments, rheological agents, impact modifiers, adhesion promoters, optical brighteners, flame retardants, antisweating agents, nucleating agents, solvents and their mixtures.

These additives can be present in the composition A and/or the composition B of the composition according to the invention.

Use may be made, by way of example of plasticizing agent which can be used, of any plasticizing agent customarily used in the field of adhesive compositions.

Preferably, use is made of:
  diisodecyl phthalate, such as, for example, sold under the name Palatinol™ DIDP by BASF,
  an ester of alkylsulfonic acid and of phenol, such as, for example, sold under the name Mesamoll® by Lanxess,
  diisononyl 1,2-cyclohexanedicarboxylate, such as, for example, sold under the name Hexamoll Dinch® by BASF,
  pentaerythritol tetravalerate, such as, for example, sold under the name Pevalen™ by Perstorp.

Mention may be made, as examples of rheological agent(s) which can be used, of any rheological agent customarily used in the field of adhesive compositions.

Preferably, the thixotropic agents are chosen from:
  PVC plastisols, corresponding to a suspension of PVC in a plasticizing agent which is miscible with PVC, obtained in situ by heating to temperatures ranging from 60° C. to 80° C. These plastisols can be those described in particular in the publication Polyurethane Sealants, Robert M. Evans, ISBN 087762-998-6,
  fumed silica, such as, for example, sold under the name HDK® N20 by Wacker;
  urea derivatives resulting from the reaction of an aromatic diisocyanate monomer, such as 4,4'-MDI, with an aliphatic amine, such as butylamine. The preparation of such urea derivatives is described in particular in the patent application FR 1591172;
  micronized starch waxes, such as Crayvallac SLX sold by Arkema.

The composition A can optionally comprise at least one aliphatic urethane-acrylate oligomer.

It can, for example, be CN925® (aliphatic tetrafunctional urethane-acrylate having an Mn of approximately 2500 g/mol), CN 92455® (aliphatic trifunctional urethane-acrylate having an Mn of approximately 5000 g/mol), CN981® (urethane-acrylate having a number-average molecular weight (Mn) of approximately 2000 g/mol) or CN9400® (urethane-allylic of functionality 6 having a number-average molecular weight (Mn) of approximately 4000 g/mol) which are sold by Sartomer.

According to one embodiment, the composition A/composition B ratio by volume ranges from 100/5 to 1/1, preferably from 10/1 to 1/1.

According to a preferred embodiment, the abovementioned composition comprises:
  a composition A comprising:
    from 1% to 30%, preferably from 5% to 20%, by weight of polymer(s) P as described above; and
    from 20% to 90%, preferably from 40% to 70%, by weight of (meth)acrylate monomer(s);
    with respect to the total weight of the composition A;
  a composition B comprising:
    from 20% to 80%, preferably from 30% to 70%, by weight of at least one peroxide; and
    optionally from 20% to 90% by weight of (meth)acrylate monomer(s);
    with respect to the total weight of the composition B.

Preferably, the composition according to the invention is an adhesive composition.

Ready-for-Use Kit

The present invention also relates to a ready-for-use kit comprising the composition A as defined above, on the one hand, and the composition B as defined above, on the other hand, packaged in two separate compartments. It can, for example, be a two-component cartridge.

This is because the composition according to the invention can be in a two-component form, for example within a ready-for-use kit, comprising the composition A, on the one hand, in a first compartment or drum and the composition B, on the other hand, in a second compartment or drum, in proportions suitable for direct mixing of the two components, for example by means of a metering pump.

According to one embodiment of the invention, the kit additionally comprises one or more means making possible the mixing of the compositions A and B. Preferably, the mixing means are chosen from metering pumps or static mixers with a diameter suited to the amounts used.

Uses of the Compositions

The present invention also relates to the use of a composition as defined above as adhesive, mastic or coating, preferably as adhesive.

The invention also relates to the use of said composition in the repair and/or the structural or semistructural adhesive bonding of materials in the transportation, motor vehicle (car, bus or truck), marine or construction field.

The present invention also relates to a process for assembling two substrates by adhesive bonding, comprising:
- the coating, onto at least one of the two substrates to be assembled, of a composition obtained by mixing the compositions A and B as defined above; then
- the effective bringing of the two substrates into contact;
- the crosslinking of the composition.

The crosslinking stage can be carried out at a temperature between 0° C. and 200° C., preferably between 10° C. and 150° C., preferably between 23° C. and 80° C. and in particular between 20° C. and 25° C.

The crosslinking can also be induced using microwaves.

The appropriate substrates are, for example, inorganic substrates, such as concrete, metals or alloys (such as aluminum alloys, steel, non-ferrous metals and galvanized metals); or else organic substrates, such as wood, plastics, such as PVC, polycarbonate, PMMA, polyethylene, polypropylene, polyesters, epoxy resins; substrates made of metal and composites coated with paint.

The compositions according to the invention are advantageously not very toxic due to the incorporation of the amines of formula (I) or (II) in the polyurethane. This incorporation advantageously makes it possible to result in adhesives having good adhesion properties.

The compositions according to the invention advantageously result in reaction kinetics having a controlled exotherm and in particular of less than 100° C., which makes it possible to prevent damage to the adhesively bonded substrates and/or to maintain a good visual appearance.

The compositions according to the invention advantageously have a crosslinking time similar to that of compositions comprising free substituted anilines (that is to say, not incorporated in a polymer).

The compositions according to the invention advantageously result in crosslinked products having good elongation properties, in particular because of the polyurethane initially contained in the compositions. The use of such polymers advantageously results in crosslinked products, such as adhesives, which are less brittle and more impact resistant, and which thus can be used in various applications.

All the embodiments described above can be combined with one another. In particular, the different abovementioned constituents of the composition, and especially the preferred embodiments of the composition, can be combined with one another.

In the context of the invention, the term "between x and y" or "ranging from x to y" is understood to mean a range in which the limits x and y are included. For example, the range "between 0% and 25%" includes in particular the values 0% and 25%.

FIG. 1 describes the reaction kinetics of the composition No. 1 according to the invention and of the comparative composition No. 2. The axis of the ordinates corresponds to the temperature in degrees Celsius, while the axis of the abscissae corresponds to the time in seconds.

The invention is now described in the following implementational examples, which are given purely by way of illustration and should not be interpreted in order to limit the scope thereof.

Experimental Part

The following ingredients were used:

Suprasec 2004 sold by HUNTSMAN is a diphenylmethane diisocyanate (MDI) comprising approximately 70% by weight of 4,4'-MDI monomer and approximately 30% by weight of 2,4'-MDI monomer, of functionality 2 and having a viscosity of 15 mPa·s at 25° C. and an NCO percentage of 32.8%;

2-hydroxyethyl acrylate (HEA) sold by BASF;

2-hydroxyethyl methacrylate (HEMA) sold by BASF;

Scuranate® T100 sold by Vencorex and corresponding to a mixture of TDI isomers comprising at least 99% by weight of 2,4-TDI isomer. Its NCO percentage is 48.1%;

Voranol™ P1000 sold by Dow is a polypropylene glycol (PPG) of functionality F=2 having an $N_{OH}$ of 112 mg KOH/g;

Borchi Kat® 315: catalyst based on bismuth neodecanoate (available from Borchers);

Acclaim® 4200 sold by Covestro is a difunctional PPG with a number-average molecular weight of approximately 4000 g/mol and with a hydroxyl number $N_{OH}$ equal to 28 mg KOH/g;

Acclaim® 8200 sold by Covestro is a difunctional PPG with a number-average molecular weight of 8016 g/mol and with a hydroxyl number $N_{OH}$ equal to 14 mg KOH/g;

methyl methacrylate (MMA) sold by Arkema;

Bisomer® PTE sold by Geo Specialty Chemicals is toluidine ethoxylated with 2.5 moles of ethylene oxide (EO) having an Mn of approximately 217.3 g/mol;

Retic BP 50 sold by Arkema is benzoyl peroxide;

Pevalen sold by Perstorp is pentaerythritol tetravalerate;

HDK® N20: fumed silica sold by Wacker;

SR 256 sold by Sartomer is 2-(2-ethoxyethoxy)ethyl acrylate (EOEOEA);

CN981® sold by Sartomer is a urethane-acrylate having a number-average molecular weight (Mn) of 2000 g/mol;

CN9400® sold by Sartomer is a urethane-allylic of functionality 6 having a number-average molecular weight (Mn) of 4000 g/mol;

Copoblock: MMA-BuMA block copolymer with an average Mn of 60000 g/mol;

Clearstrength® XT 100: MMA-Butadiene-Styrene (MBS) impact modifier sold by Arkema.

Example 1: Preparation of the Polyurethane P1

| Ingredients | Amount (g) | Amount (%) |
| --- | --- | --- |
| Scuranate 1100 | 59.33 | 19.77 |
| Voranol P1010 | 46.83 | 15.61 |
| Bisomer PTE | 16.86 | 5.62 |
| Methyl methacrylate | 90.7 | 30.23 |
| 2-Hydroxyethyl acrylate | 39.5 | 13.16 |

The Voranol P1010 was introduced into a reactor and heated at 85-90° C. under vacuum for approximately 1 h in order to dehydrate the polyol. The Scuranate T100 was introduced into the reactor and heated at 75° C. for approximately 2 h. Next, the reactor was equipped with a reflux condenser. The reaction medium was cooled to 70° C. and the Bisomer PTE was introduced. After a few minutes, the methyl methacrylate was introduced. Subsequently, the 2-hydroxyethyl methacrylate was introduced and the reaction medium was mixed at 70° C. for 1 h.

Example 2: Preparation of the Polyurethane P2

| Formula | Amount (g) | Amount (%) |
|---|---|---|
| Acclaim 4200 | 222.7 | 44.58 |
| Acclaim 8200 | 63.6 | 12.73 |
| Suprasec X2004 | 68.8 | 13.82 |
| Bisomer PTE | 32.8 | 6.37 |
| Methyl methacrylate (MMA) | 100.3 | 20.08 |
| 2-Hydroxyethyl methacrylate (HEMA) | 11.5 | 2.41 |
| Borchi Kat 315 | 0.05 | 0.01 |

The Acclaim 4200 and the Acclaim 8200 were introduced into a reactor and heated at 85-90° C. under vacuum for approximately 1 h in order to dehydrate the polyols. The Suprasec X2004 was introduced into the reactor and heated at 75° C. for approximately 2 h. The reactor was equipped with a reflux condenser. The reaction medium was cooled to 70° C. and the Bisomer PTE was introduced. After a few minutes, the methyl methacrylate was introduced.

Subsequently, the 2-hydroxyethyl methacrylate and the Borchi Kat 315 were introduced and the reaction medium was mixed at 70° C. for 1 h.

At D+1, the Brookfield viscosity of the composition obtained was measured at 23° C. (needle, 10 r/min): 29000 mPa·s Example 3: Preparation of the Compositions The various ingredients constituting the component A are mixed in the proportions shown in the following table, at a temperature of 23° C., in a reactor kept constantly stirred and under nitrogen.

The various ingredients constituting the component B are mixed in the proportions shown in the following table, at a temperature of 23° C., in a reactor kept constantly stirred and under nitrogen.

Composition No. 1

| Component A | | | Component B | | |
|---|---|---|---|---|---|
| Ingredients | Formula (g) | % | Ingredients | Formula (g) | % |
| Polyurethane P1 (example 1) | 12 | 24 | Methyl methacrylate (MMA) | 2.5 | 50 |
| CN 981 | 2 | 4 | Retic 50 | 2.5 | 50 |
| CN 9400 | 8 | 16 | Pevalen | 0 | 0 |
| 33% copoblock in MMA | 12 | 24 | HDKN 20 | 0 | 0 |
| 20% XT100 in MMA | 11 | 22 | TOTAL | 5 | 100 |
| HDKN 20 | 0 | 0 | | | |
| SR 256 | 5 | 10 | | | |
| TOTAL | 50 | 100 | | | |

The component A and the component B above were mixed, in a 10:1 ratio by volume. The mixing is carried out at a temperature of approximately 23° C., according to the given ratio by volume, with a static mixer.

A comparative composition No. 2 was prepared in the same way with the following ingredients:

Composition No. 2 (comparative)

| Component A | | | Component B | | |
|---|---|---|---|---|---|
| Ingredients | Formula (g) | % | Ingredients | Formula (g) | % |
| MMA | 47 | | Methyl methacrylate (MMA) | 2.5 | 50 |
| CN 981 | 6.3 | | | | |
| CN 9400 | 15 | | Retic 50 | 2.5 | 50 |
| Bisomer PTE | 0.7 | | Pevalen | 0 | 0 |
| M65ST | 13.1 | | HDKN 20 | 0 | 0 |
| XT100 | 5.2 | | | | |
| HDKN 20 | 2.5 | | TOTAL | 5 | 100 |
| SR 256 | 10.2 | | | | |
| TOTAL | 100 | | | | |

Results with Regard to Exothermicity

The temperatures of the mixture were recorded between 0 min and 65 min.

The composition according to the invention (composition No. 1) results in reaction kinetics advantageously having a controlled exotherm of less than 100° C., preferably of less than 90° C. (measured from a mixture of 30 ml of product), which is advantageously less than the exotherm observed with the composition No. 2 comprising the free Bisomer® PTE.

This advantageously makes it possible to avoid damaging the adhesively bonded substrates and/or makes it possible to maintain a good visual appearance of the adhesive bonding.

Furthermore, FIG. 1 advantageously shows that the composition No. 1 of example 3 advantageously crosslinks as rapidly as a comparative composition No. 2 comprising the free Bisomer PTE.

The invention claimed is:
1. A process for the preparation of a polyurethane comprising:
E1) a stage of preparation of a polyurethane having NCO endings comprising the polyaddition reaction between:
   i) at least one polyisocyanate;
   ii) at least one polyol; and
   iii) at least one amine having the following formula (I) or (II):

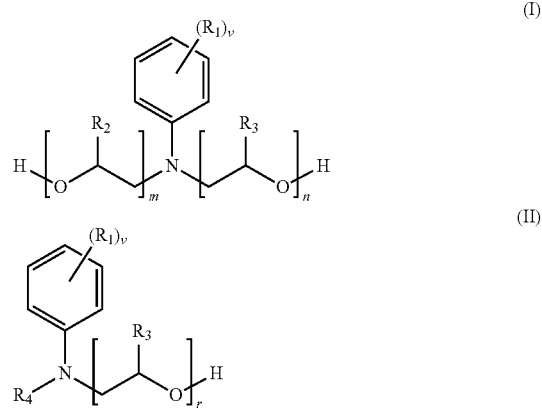

wherein:
m and n are, independently of each other, an integer ranging from 1 to 150;
r is an integer ranging from 1 to 200;

R' represents a radical selected from the group consisting of a saturated or unsaturated and linear or branched alkyl comprising from 1 to 20 carbon atoms;

v represents an integer ranging from 0 to 5;

$R^2$ and $R^3$ represent, independently of each other, a halogen atom, a hydrogen atom or a linear or branched alkyl group comprising from 1 to 12 carbon atoms, said alkyl group being optionally interrupted by at least one oxygen atom;

$R^4$ represents a hydrogen atom, an arylalkyl group or a linear or branched alkyl group comprising from 1 to 20 carbon atoms;

provided that m+n>2;

and

E2) the reaction of the product formed on conclusion of stage E1) with at least one (meth)acrylate or allyl monomer M comprising at least one hydroxyl functional group.

2. The process as claimed in claim 1, wherein the amines of formula (I) are chosen from those wherein:

$R^1$ represents a saturated or unsaturated and linear or branched alkyl comprising from 1 to 20 carbon atoms;

m and n represent, independently of each other, an integer ranging from 1 to 18;

$R^2$ and $R^3$ represent, independently of each other, a hydrogen atom or a linear or branched alkyl group comprising from 1 to 12 carbon atoms, said alkyl group being optionally interrupted by at least one oxygen atom;

with m+n>2.

3. The process as claimed in claim 1, wherein the amines of formula (I) are those wherein:

$R^1$ represents a linear or branched alkyl comprising from 1 to 5 carbon atoms;

m and n represent, independently of each other, an integer ranging from 1 to 18;

$R^2$ and $R^3$ represent a hydrogen atom;

with that m+n>2.

4. The process as claimed in claim 1, wherein stage E1) is carried out in the presence of amine(s) of formula (I).

5. The process as claimed in claim 1, wherein the monomer M is chosen from:

M1 monomers having the following formula (III):

CH$_2$=CH—R$^1$—OH                                       (III)

wherein R' represents a linear or branched alkylene radical comprising from 1 to 9 carbon atoms; or M2 monomers having the following formula (IV):

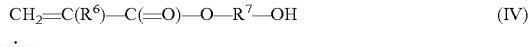
CH$_2$=C(R$^6$)—C(=O)—O—R$^7$—OH                        (IV)

wherein:

$R^6$ represents a hydrogen or a methyl;

$R^7$ represents a saturated or unsaturated, aliphatic or cyclic, linear or branched, divalent hydrocarbon radical, and being optionally interrupted by one or more heteroatoms, and/or optionally interrupted by one or more aromatic groups, and/or optionally interrupted by one or more divalent —N(R$_a$)— groups with R$_a$ representing a linear or branched alkyl radical comprising from 1 to 22 carbon atoms (tertiary amine), —C(=O)O— (ester), —C(=O)NH— (amide), —NHC(=O)O— (carbamate), —NHC(=O)—NH— (urea) or —C(=O)— (carbonyl) groups, and/or being optionally substituted.

6. The process as claimed in claim 5, wherein the M2 monomer has one of the following formulae:

Formula (IV-1):

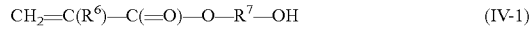
CH$_2$=C(R$^6$)—C(=O)—O—R$^7$—OH                        (IV-1)

wherein:

$R^6$ represents a hydrogen or a methyl;

$R^7$ represents a saturated or unsaturated, linear or branched, aliphatic or cyclic, divalent alkylene radical comprising from 2 to 22 carbon atoms;

Formula (IV-2):

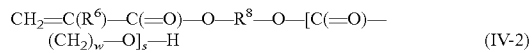
CH$_2$=C(R$^6$)—C(=O)—O—R$^8$—O—[C(=O)—(CH$_2$)$_w$—O]$_s$—H    (IV-2)

wherein:

$R^6$ represents a hydrogen or a methyl;

w is an integer ranging from 1 to 10;

s is an integer ranging from 1 to 10;

$R^8$ represents a saturated or unsaturated, linear or branched, aliphatic or cyclic, divalent alkylene radical comprising from 2 to 22 carbon atoms;

Formula (IV-3):

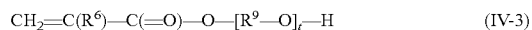
CH$_2$=C(R$^6$)—C(=O)—O—[R$^9$—O]$_t$—H                  (IV-3)

wherein:

$R^6$ represents a hydrogen or a methyl;

$R^9$ represents a saturated or unsaturated, linear or branched, aliphatic or cyclic, divalent alkylene radical comprising from 2 to 4 carbon atoms and t is an integer ranging from 2 to 120.

7. The process as claimed in claim 1, wherein the monomer M has one of the following formulae (IV-1-1), (IV-1-2) or (IV-1-3):

(IV-1-1): 2-hydroxyethyl acrylate (HEA):

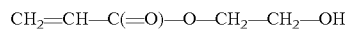
CH$_2$=CH—C(=O)—O—CH$_2$—CH$_2$—OH (IV-1-2): 2-hydroxypropyl acrylate (HPA):

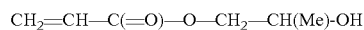
CH$_2$=CH—C(=O)—O—CH$_2$—CH(Me)-OH (IV-1-3): 2-hydroxyethyl methacrylate (HEMA):

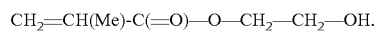
CH$_2$=CH(Me)-C(=O)—O—CH$_2$—CH$_2$—OH.

8. The process as claimed in claim 1, wherein stage E1) is carried out in amounts of reactants such that the NCO/OH molar ratio (r1) ranges from 1.5 to 5.

9. The process as claimed in claim 1, wherein the at least one polyol is selected from the group consisting of polyester polyols, polyether polyols, polyene polyols, polycarbonate polyols, poly (ether-carbonate) polyols and their mixtures.

10. The process as claimed in claim 1, wherein the at least one polyol comprises at least one polyether polyol.

11. The process as claimed in claim 1, wherein stage E2) is carried out in amounts of reactants such that the OH/NCO molar ratio (r2) is less than or equal to 1.

12. A polyurethane P obtained according to the process of claim 1.

13. The polyurethane P as claimed in claim 12, comprising from 0.5% to 10%, by weight of units derived from the amine of formula (I) or (II).

14. The polyurethane P as claimed in claim 12, wherein the polyurethane P has a viscosity at 70° C. ranging from 5000 mPa·s to 50 000 mPa·s.

15. A composition comprising:

a composition A comprising:

at least one polymer P as defined in claim 12; and at least one vinyl monomer; and a composition B comprising:
at least one peroxide; and
optionally at least one vinyl monomer.

16. The composition as claimed in claim 15, wherein the vinyl monomers are chosen from (meth)acrylate monomers selected from the group consisting of:
compounds having the following formula (V):

$$CH_2=C(R^{10})-COOR^{11} \qquad (V)$$

wherein:
R$^{10}$ represents a hydrogen, a halogen, a CN group, an alkyl group having 1 carbon atom, an alkyl group having 2 carbon atoms, an alkyl group having 3 carbon atoms, or an alkyl group having 4 carbon atoms;
R$^{11}$ is selected from the group consisting of alkyls, cycloalkyls, alkenyls, cycloalkenyls, alkylaryls, arylalkyls and aryls, wherein said alkyls, cycloalkyls, alkenyls, cycloalkenyls, alkylaryls, arylalkyls or aryls are optionally substituted and/or interrupted by at least one silane, one silicone, one oxygen, one halogen, one carbonyl, one hydroxyl, one ester, one urea, one urethane, one carbonate, one amine, one amide, one sulfur, one sulfonate or one sulfone;
polyethylene glycol di(meth)acrylates;
tetrahydrofuran (meth)acrylates;
hydroxypropyl (meth)acrylate;
hexanediol di(meth)acrylate;
trimethylolpropane tri (meth)acrylate;
diethylene glycol dimethacrylate;
triethylene glycol dimethacrylate;
tetraethylene glycol dimethacrylate;
dipropylene glycol dimethacrylate;
di(pentamethylene glycol) dimethacrylate;
tetraethylene glycol diacrylate;
diglycerol tetramethacrylate;
tetramethylene dimethacrylate;
ethylene dimethacrylate;
neopentyl glycol diacrylate;
trimethylolpropane triacrylate;
bisphenol A mono- and di(meth)acrylates;
bisphenol F mono- and di(meth)acrylates; and
their mixtures.

17. The composition as claimed in claim 16, wherein the (meth)acrylate monomer is selected from the group consisting of methyl 2-cyanoacrylate, ethyl 2-cyanoacrylate, butyl 2-cyanoacrylate, octyl 2-cyanoacrylate, 2-methoxyethyl 2-cyanoacrylate, 2-ethoxyethyl 2-cyanoacrylate, methyl (meth)acrylate, ethyl (meth)acrylate, 2-ethylhexyl (meth)acrylate, heptyl (meth)acrylate, 2-(tert-butyl)heptyl (meth)acrylate, octyl (meth)acrylate, 3-isopropylheptyl (meth)acrylate, nonyl (meth)acrylate, decyl (meth)acrylate, undecyl (meth)acrylate, 5-methylundecyl (meth)acrylate, dodecyl (meth)acrylate, 2-methyldodecyl (meth)acrylate, tridecyl (meth)acrylate, 5-methyltridecyl (meth)acrylate, tetradecyl (meth)acrylate, pentadecyl (meth)acrylate, hexadecyl (meth)acrylate, 2-methylhexadecyl (meth)acrylate, heptadecyl (meth)acrylate, 5-isopropylheptadecyl (meth)acrylate, 4-(tert-butyl)octadecyl (meth)acrylate, 5-ethyloctadecyl (meth)acrylate, 3-isopropyloctadecyl (meth)acrylate, octadecyl (meth)acrylate, nonadecyl (meth)acrylate, eicosyl (meth)acrylate, 3-vinylcyclohexyl (meth)acrylate, bornyl (meth)acrylate, 2,4,5-tri (t-butyl)-3-vinylcyclohexyl (meth)acrylate, 2,3,4,5-tetra (t-butyl)cyclohexyl (meth)acrylate, benzyl (meth)acrylate, phenyl (meth)acrylate, 2-(2-ethoxyethoxy)ethyl (meth)acrylate, 2-phenoxyethyl (meth)acrylate and their mixtures.

18. The composition as claimed in claim 15, wherein the peroxide functional group/amine functional group of formula (I) contained in the polyurethane P molar ratio ranges from 0.3 to 1.5.

19. A ready-for-use kit comprising the composition A as defined in claim 15, on the one hand, and the composition B as defined in claim 15, on the other hand, packaged in two separate compartments.

20. An adhesive comprising the composition of claim 15.

* * * * *